United States Patent Office 3,520,768
Patented July 14, 1970

3,520,768
LAMINATED SAFETY PANES OF GLASS AND POLYCARBONATE USING ACRYLIC ESTER ADHESIVES
Günter Peilstöcker, Krefeld-Bockum, and Karl Dietzel, Krefeld-Uerdingen, Germany, assignors to Farbenfabriken Bayer Aktiengesellschaft, Leverkusen, Germany, a corporation of Germany
No Drawing. Filed Dec. 12, 1966, Ser. No. 600,749
Int. Cl. B32b 27/36, 17/06
U.S. Cl. 161—125      8 Claims

ABSTRACT OF THE DISCLOSURE

Laminate of relatively thick glass plates having a comparatively thin polycarbonate foil inserted between the same and adhered in position with clear-transparent adhesive layers and the utility thereof as safety panes.

---

The commercially available laminated safety panes consist of two glass plates of about 2 to 4 mm., preferably about 3 mm. thickness, which are cemented with one another with a layer of an elastic adhesive of about 0.05 to 1.0 mm., preferably about 0.1 to 0.5, thickness, which is, as a rule, a plasticizer-containing polyvinyl butyral.

These laminated panes generally withstand, at room temperature, blows of an energy of up to about 1.5 mkp. When subjected to a stronger stress, they are pierced. In such a case it is the advantage of these panes that the bulk of the glass splinters thus occurring do not fly but is held by the adhesive layer, and the remainder drops down without force. If, however, the piercing is brought about by a part of the human body, e.g. the head, for example through a windshield of a car, then there is nevertheless a risk for this part of the body to receive heavy cut injuries due to the formation of the so-called "neck ruff."

There have already been proposed safety panes which consist of a plate of at least about 2 mm. thickness made from high molecular weight, linear bisphenol polycarbonate, these plates themselves being provided with scratch-resistant surface layers. By one method of producing these safety panes both scratch-resistant surface layers consist of a preferably not more than about 1.5 mm. thick glass plate which are combined with the polycarbonate plate by an about 0.1 mm. thick adhesive layer. The polycarbonate plate of these safety panes constitutes the preponderant part of the total material, since the glass plate only serves to give a scratch-resistant surface to the polycarbonate plate. The other properties of these safety panes are therefore almost exclusively determined by the properties of the polycarbonate plate.

Consequently, the most important advantage of these safety panes consists in that they are not pierced even by violent blows due to the high impact strength of the polycarbonate plate; at the most, the glass cover plates crack, but practically no glass splinters are in this case chipped off since they adhere to the adhesive layer. The feared "neck ruff" cannot occur.

Another advantage of these panes is afforded by the favourable absorption behaviour of the polycarbonates towards light rays so that almost no losses occur in the visible spectrum, whereas the generally undesired ultraviolet and infra-red rays are almost completely absorbed. There may also be mentioned the better heat isolation compared with those panes which consist entirely of glass, this isolation essentially being the cause of these panes becoming less readily misted up at varying temperatures than glass panes.

As far as these safety panes consist of a clear-transparent polycarbonate and clear-transparent glass plates and the adhesive layers are also so chosen that they are clear-transparent, these panes can be used e.g. in the manufacture of power-propelled vehicles, in particular for motor vehicles and railway vehicles. However, they are less suitable to be used as windshields since, when the head of a passenger, for example, should hit the windshield, a repercussion might occur which could lead to a serious concussion of the brain ("pendulum trauma") or even to a fracture of the vertebrae of the neck.

The object of the present invention comprises laminated safety panes which are characterised in that they consist, in contradistinction to the fundamental idea of the aforementioned known safety panes, of two thicker glass plates and a comparatively thin polycarbonate foil inserted in between, i.e. they consist of two clear-transparent glass plates which have a thickness of about 2.5 to 7 mm., preferably about 2.8 to about 3.5 mm., which are optionally curved, optionally coloured and prestressed, preferably ground and polished on both sides, and between which a clear-transparent, optionally coloured foil having a thickness of about 0.5 to at most about 2 mm., preferably about 0.7 to about 1.5 mm., produced from high molecular weight polycarbonate of bivalent phenols is slidably inserted by means of a clear-transparent adhesive layer having a thickness of about 0.05 mm. to about 1.0 mm.

It has been found that the usefulness of such safety panes is greater for many purposes of application, in particular for glazing vehicle windows, e.g. as windscreens of motor vehicles, than that of the afore-mentioned known safety panes.

In spite of the relatively small thickness of the polycarbonate foil, a safety pane of this type, surprisingly, withstands all shock loads occurring in practice to such panes, as satisfactorily as the safety panes which essentially consist of a thicker polycarbonate plate, i.e. they also are not pierced. If the impact is sufficiently strong to break the comparatively thick glass plates, then the remaining impact energy can also be completely resisted by the thin polycarbonate foil, in this case however not by resilience but, surprisingly, by the fact that the foil becomes deformed at the point of the impact load, due to a stretching process by which the energy is destroyed, although the polycarbonates can normally be stretched only with difficulty or to a limited extent below the transition temperature. It is possible that the impact energy occurring within a narrow space results in a sufficient local rise in temperature that the transition temperature is exceeded at this point and the foil, as mentioned above, becomes deformed, while stretching takes place.

If the glass plates and/or the polycarbonate plate would be too thin, then the whole energy would not be consumed by the breaking of the glass plates and the deformation of the polycarbonate plate, the pane could be pierced and thus behave in a similar manner as the known laminated panes. If the glass plates would be too thick, then it would not crack and the aforementioned resilience would occur. If, on the other hand, the polycarbonate plate would be too thick, then it would not be deformed and thus resilience would again occur.

Thus, according to the invention, the thickness of the glass plates and the thickness of the polycarbonate plate are so chosen that the laminated pane produced therefrom by cementing withstands fairly insignificant blows without change, but that it destroys higher impact energies, thus excluding the risk of cut injuries and the "pendulum trauma." Within the thickness limits according to the invention, the impact limit up to which the pane remains undamaged, can be adjusted, as desired, to a certain extent, depending upon the choice of thinner or thicker glass plates and/or a thinner or thicker polycarbonate plate. In most cases, it is advantageous to combine thinner glass plates with a thicker polycarbonate plate or vice versa, or to use all three plates of a medium thickness.

It is to be emphasised that the afore-mentioned permanent deformation of the polycarbonate plate is conditioned by the special property of the polycarbonates themselves, i.e. that they are very rigid, on the one hand, below the transition temperature which is throughout very high and lies at about 140° C., e.g. in the case of a polycarbonate from bisphenol A (2,2-bis-[phenylol]-propane), that they do not exhibit a cold flow and are therefore not capable of having a permanent plastic deformation in the true sense of the term—otherwise the plates would not have a permanent consistency—but are, on the other hand, stretchable under certain conditions. Thus, in this case, the permanent deformation is the consequence of a stretching process absorbing substantial energies.

Furthermore, the capacity of the polycarbonate to absorb ultra-violet and infra-red rays is so great that even a thin foil still suffices to bar these rays almost completely by the safety panes. In respect to the optical properties, there is added the fact that the glass plates having a thickness of about 2.5 mm. and, in particular, of 2.8 mm. onwards, can be ground and polished on both sides in contradistinction to the thinner glass plates, so that it is preferable to use such so-called plate-glass sheets. The new safety panes, therefore, meet to a far greater extent the very high requirements which are demanded for the optical quality, especially of windscreens in motor vehicles, which are generally made in a curved form (compare, for example, "Verkehrsblatt," Amtsblatt des Bundesministers fuer Verkehr der Bundesrepublik Deutschland, 19th vol., 1965, No. 3, pages 61–116, especially page 89, para. B, 25 (2) 1c) and page 91, left column, 3.

Last not least it should be mentioned that the production of larger, especially curved, panes by sticking a thin resilient polycarbonate foil between thicker, possibly curved, glass plates is, from a technical point of view, substantially easier to carry out than to combine a thicker polycarbonate plate which has already become almost rigid with likewise almost rigid glass plates even if they are thinner.

The combination of these properties cannot be found in any other, previously known synthetic material. Finally, it may be mentioned that also the comparatively low thermal conductivity of the polycarbonates has a favourable effect in that the tendency of becoming misted up at varying temperatures is thereby substantially reduced. For this reason, the afore-mentioned polycarbonates in particular, in combination with glass are so eminently well suited for the use of laminated safety panes.

The production of high-molecular weight, thermoplastic polycarbonates of bivalent phenols, especially bisphenylol alkanes, is known and described e.g. in U.S. Pat. Nos. 2,997,459, 3,136,741, 3,028,365, 3,275,601. Especially suitable for the purpose of the present invention are polycarbonates having molecular weights between about 20,000 and 200,000, particularly those which are produced from bis-(4-hydroxyphenyl)dimethylmethane. If desired, the polycarbonate may contain a stabilizer against ultra-violet rays produced, e.g. according to the U.S. patent application Ser. No. 410,704, filed Nov. 12, 1964, now Pat. No. 3,322,719 or other suitable additives. From these polycarbonates the approximately 0.5 to 2 mm. thick plates can be cast in known manner from the melt through slot dies. In order to impart to these plates almost completely plane-parallel surfaces and thus optical isometry, it is generally expedient to subject them, also in known manner, to an after treatment in a plates press or in a calender.

Suitable adhesives which can also be used for the afore-mentioned known safety panes are the following, for example, silicone rubber and hardenable polyester/styrene mixtures, preferably those in which the mixing ratio of polyester:styrene is at least about 4:1, as well as plasticized epoxide resins, furthermore the poly-vinyl-butyral foils known from the production of safety panes, and the like. The known, more or less plasticized polyacrylate adhesives have been found to be especially advantageous for the use as adhesives, since they possess, even in comparatively thick layers, a special optical transparency, an excellent adhesion to glass and polycarbonate and a cohesion suitable for slideable cementing, which is sufficiently retained even up to temperatures to about −30° C. Particularly suitable as adhesive layers for the production of the laminated safety panes according to the invention are foils of a copolymer from 65 percent by weight of 2-ethyl-hexyl acrylate and 35 percent by weight of methyl methacrylate and a copolymer from 65 percent by weight of butyl acrylate and 35 percent by weight of methyl acrylate, these copolymers having a relative viscosity between about 1.5 and about 2.0, measured in a solution of 0.5 gram of substance in 100 ml. benzene at 20° C., as described in the German patent applications Nos. F 49,912 and F 49,911 respectively.

Cementing of the three panes is carried out in the manner known for the production of laminated panes.

The new laminated safety panes can be used everywhere where it is desired that the panes are not pierced even by violent blows and where the risk of cut injuries is to be excluded. On account of the special properties of the new panes described above in greater detail, they are intended to be used as safety panes in vehicles of any kind, especially as windscreens in road vehicles.

The following examples are given for the purpose of illustrating the invention.

EXAMPLE 1

On to a 30 x 30 cm. large and 2.8 mm. thick plate-glass sheet there is placed a 0.5 mm. thick adhesive foil of the same size, produced from a copolymer of 65 percent by weight of 2-ethylhexyl acrylate and 35 percent by weight of methyl methacrylate of a relative viscosity 1.815, measured in a solution of 0.5 g. substance in 100 ml. benzene at 20° C. On this there is placed a 30 x 30 cm. large and 0.8 mm. thick plate of bisphenol-A-polycarbonate of a relative viscosity 1.32, measured in a solution of 0.5 g. substance in 100 ml. methylene chloride at 25° C. An adhesive foil of the same size and of the same composition is then again placed thereon and finally a plate-glass sheet of the same size. In order to avoid that the five layers do not shift one against the other in the following operation, the laminate is held together by means of clamps. It is then heated in an autoclave to 130° C. under a pressure of 100 mm. Hg and thereupon slowly cooled to room temperature in the course of 60 minutes while simultaneously increasing the pressure to atmospheric pressure. A clear-transparent laminated pane is obtained.

EXAMPLE 2

The procedure is the same as that described in Example 1, but two pre-stressed plate-glass sheets are used.

EXAMPLE 3

The procedure is the same as that described in Example 1, but as adhesive foil there is used one obtained from a copolymer of 65 percent by weight butyl acrylate and 35 percent by weight of methyl methacrylate of a relative viscosity 1.75.

We claim:
1. A laminated safety pane comprising two clear-transparent glass plates having a thickness of about 2.5 to about 7 mm. and a clear-transparent foil of a high molecular weight polycarbonate of a bivalent phenol having a thickness of about 0.5 to a maximum of about 2 mm. sandwiched between said glass plates and adhesively bonded thereto by interposed clear-transparent adhesive layers having a thickness of about 0.05 to about 1.0 mm., said adhesive layers consisting of a copolymer containing 65% by weight of polymerized 2-ethyl-hexyl acrylate or butyl acrylate and 35% by weight of polymerized methyl methacrylate and said copolymer having a relative viscosity between about 1.5 to about 2.0, measured in a solution of 0.5 g. of copolymer in 100 ml. benzene at 20° C.

2. The laminated safety pane of claim 1 wherein the thickness of the glass plates is from about 2.8 to about 3.5 mm.

3. The laminated safety pane of claim 1 wherein said glass plates are curved.

4. The laminated safety pane of claim 1 wherein said glass plates are ground and polished on both surfaces thereof.

5. The laminated safety pane of claim 1 wherein said glass plates are pre-stressed.

6. The laminated safety pane of claim 1 wherein said glass plates are colored.

7. The laminated safety pane of claim 1 wherein said polycarbonate foil is of a thickness from about 0.7 to about 1.5 mm.

8. The laminated safety pane of claim 1 wherein said polycarbonate foil is colored.

References Cited

UNITED STATES PATENTS

| | | | |
|---|---|---|---|
| 2,999,845 | 9/1961 | Goldberg | 260—47 |
| 3,026,232 | 3/1962 | Finch | 156—212 |
| 3,388,033 | 6/1968 | Buckley et al. | 161—183 |
| 3,388,034 | 6/1968 | McCombie | 161—183 |

OTHER REFERENCES

Skeist, Handbook of Adhesives, Reinhold, New York (1962), pp. 409–414 and 486.

JOHN T GOOLKASIAN, Primary Examiner

W. E. HOAG, Assistant Examiner

U.S. Cl. X.R.

156—332; 161—165, 183, 204; 260—861; 296—90